United States Patent
DeMarco et al.

(10) Patent No.: US 9,628,011 B2
(45) Date of Patent: Apr. 18, 2017

(54) ENGINE SPEED CONTROL VIA ALTERNATOR LOAD SHEDDING

(71) Applicant: Ford Global Technologies, LLC, Dearborn, MI (US)

(72) Inventors: John Anthony DeMarco, Lake Orion, MI (US); John Curtis Hickey, Belleville, MI (US); Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/614,881

(22) Filed: Feb. 5, 2015

(65) Prior Publication Data

US 2016/0230680 A1 Aug. 11, 2016

(51) Int. Cl.
 *H02P 9/48* (2006.01)
 *F02D 37/02* (2006.01)
 *H02P 9/00* (2006.01)
 *F02D 41/08* (2006.01)
 *F02D 41/12* (2006.01)
 *F02D 41/16* (2006.01)
 *H02P 9/04* (2006.01)
 *F02P 5/15* (2006.01)
 *F02N 11/00* (2006.01)
 *F02N 11/04* (2006.01)
 *F02P 5/152* (2006.01)

(52) U.S. Cl.
 CPC ............... *H02P 9/48* (2013.01); *F02D 37/02* (2013.01); *F02D 41/083* (2013.01); *F02D 41/12* (2013.01); *F02D 41/16* (2013.01); *F02P 5/1504* (2013.01); *H02P 9/008* (2013.01); *H02P 9/04* (2013.01); *F02D 2250/24* (2013.01); *F02N 11/006* (2013.01); *F02N 11/04* (2013.01); *F02P 5/152* (2013.01); *F02P 5/1508* (2013.01); *Y02T 10/46* (2013.01)

(58) Field of Classification Search
 CPC ...... F02D 31/003; F02D 37/02; F02P 5/1508; B60R 16/03; H02P 9/48; H02P 9/008
 See application file for complete search history.

(56) References Cited

U.S. PATENT DOCUMENTS

| | | | |
|---|---|---|---|
| 6,879,053 B1 | 4/2005 | Welches et al. | |
| 7,866,299 B2 | 1/2011 | Sato | |
| 8,569,902 B2 | 10/2013 | Gibson et al. | |
| 8,569,903 B2 | 10/2013 | Gibson et al. | |
| 8,718,853 B2 | 5/2014 | Ulrey et al. | |
| 8,751,062 B2 * | 6/2014 | Van Wiemeersch | B60R 16/033 701/113 |

(Continued)

*Primary Examiner* — Joseph Dallo
(74) *Attorney, Agent, or Firm* — Julia Voutyras; McCoy Russell LLP

(57) ABSTRACT

Method and systems are provided for adjusting an engine load exerted on a vehicle engine by an alternator mechanically coupled to said engine. In one example, a method may include when decelerating a vehicle driven by an engine, recharging a battery by an alternator driven by said engine, and during engine idle speed control, when engine speed is less than desired, in a first mode reducing electrical power to selected devices, and in a second mode offsetting a set point of desired engine ignition timing to a new set point when engine speed is higher than desired.

20 Claims, 6 Drawing Sheets

(56) References Cited

U.S. PATENT DOCUMENTS

| | | | |
|---|---|---|---|
| 8,907,620 B2 * | 12/2014 | Van Wiemeersch | B60R 16/033 180/65.1 |
| 2007/0241723 A1 | 10/2007 | Billat | |
| 2011/0163718 A1 * | 7/2011 | Van Wiemeersch | B60R 16/033 320/109 |
| 2011/0163721 A1 * | 7/2011 | Van Wiemeersch | B60R 16/033 320/128 |
| 2014/0303872 A1 * | 10/2014 | Pursifull | F02D 31/001 701/102 |
| 2015/0316002 A1 * | 11/2015 | Pursifull | F02M 3/005 123/339.12 |

* cited by examiner

ENGINE SPEED CONTROL VIA ALTERNATOR LOAD SHEDDING

FIELD

The present application relates to methods and systems for controlling the idle speed of an internal combustion engine while optimizing fuel economy and regenerative braking during deceleration.

BACKGROUND/SUMMARY

Idle speed control systems for internal combustion engines change throttle position to increase or decrease engine speed to a desired speed. Because the throttle is coupled to the air intake valve of multiple cylinders through an intake manifold, there is a delay time before the change in throttle position results in a change in engine torque and accordingly idle speed. Advancing or retarding ignition timing is therefore also used to provide a faster response time. However, advancing ignition timing beyond a steady state or nominal value may cause ignition knock. To prevent knock during idle speed control, the steady state value is retarded to an offset value so that ignition timing may be advanced when needed from the offset value to increase engine speed without inducing ignition knock.

The inventors herein have recognized that this retarded offset value reduces fuel economy and have sought to minimize the usage of such offsets. They also have recognized that idle speed control and regenerative braking can be combined in a way as described herein to enhance braking through an alternator driven by the engine while providing idle speed control with reduced usage of the retarded offset ignition timing and fast response time.

In one example, some of the above issues may be addressed by a method comprising: when decelerating a vehicle driven by an engine, recharging a battery by an alternator driven by said engine; and during engine idle speed control, when engine speed is less than desired, in a first mode reducing electrical power to selected devices, and in a second mode offsetting a set point of desired engine ignition timing to a new set point when engine speed is higher than desired. In this manner, fuel economy is improved by not creating a new retarded set point in a first mode of operation, fast response time is provided by disabling or reducing selected loads, and more regenerative braking is enhanced by battery recharging during deceleration and less during idle speed control. Thus, the alternator load may be reduced for quick-acting engine torque increase so long as some load exists in the alternator prior to the requisite engine torque increase.

The selected devices may comprise those electrical devices which if disabled or supplied with reduced electrical power would not be perceptible by an operator, such devices include one or more of the following: coolant fans, pumps, and heaters.

In another aspect, alternator torque is increased during vehicle deceleration to provide an additional braking force to the vehicle. Further, idle speed control commences when the vehicle slows to a preselected speed.

In another example, the method comprises: controlling idle speed of an engine coupled to an alternator which supplies electrical power to various electrical devices in a vehicle driven by said engine; a first mode of the engine idle speed control which is active when reducing or shutting off electrical power applied to selected ones of the electrical devices would be perceived by an operator of the vehicle; during the first engine idle speed control mode, offsetting a steady state ignition timing value of the engine in a retarded direction to an offset retarded value, and when the engine speed is less than desired advancing the ignition timing from the offset retarded value, and when the engine speed is greater than desired, retarding the ignition timing from the offset retarded value; a second mode of the engine idle speed control which is active when reducing or shutting off electrical power applied to said selected electrical devices would not be perceived by an operator of the vehicle; and during the second idle speed control mode, removing the offset retarded value, and disabling or reducing electrical power to the selected devices when the engine speed is less than desired, and retarding the ignition timing from the steady state ignition timing value when engine speed is higher than desired.

In a further example voltage regulation of electrical power provided by the alternator may be provided, the voltage regulation causing a reduction in torque of the alternator in response to the shutting off electrical power applied to the selected electrical devices.

In a further aspect, the nominal ignition timing corresponds to a steady state ignition timing and the offset ignition timing is set to allow the ignition timing advance without inducing ignition knock in the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
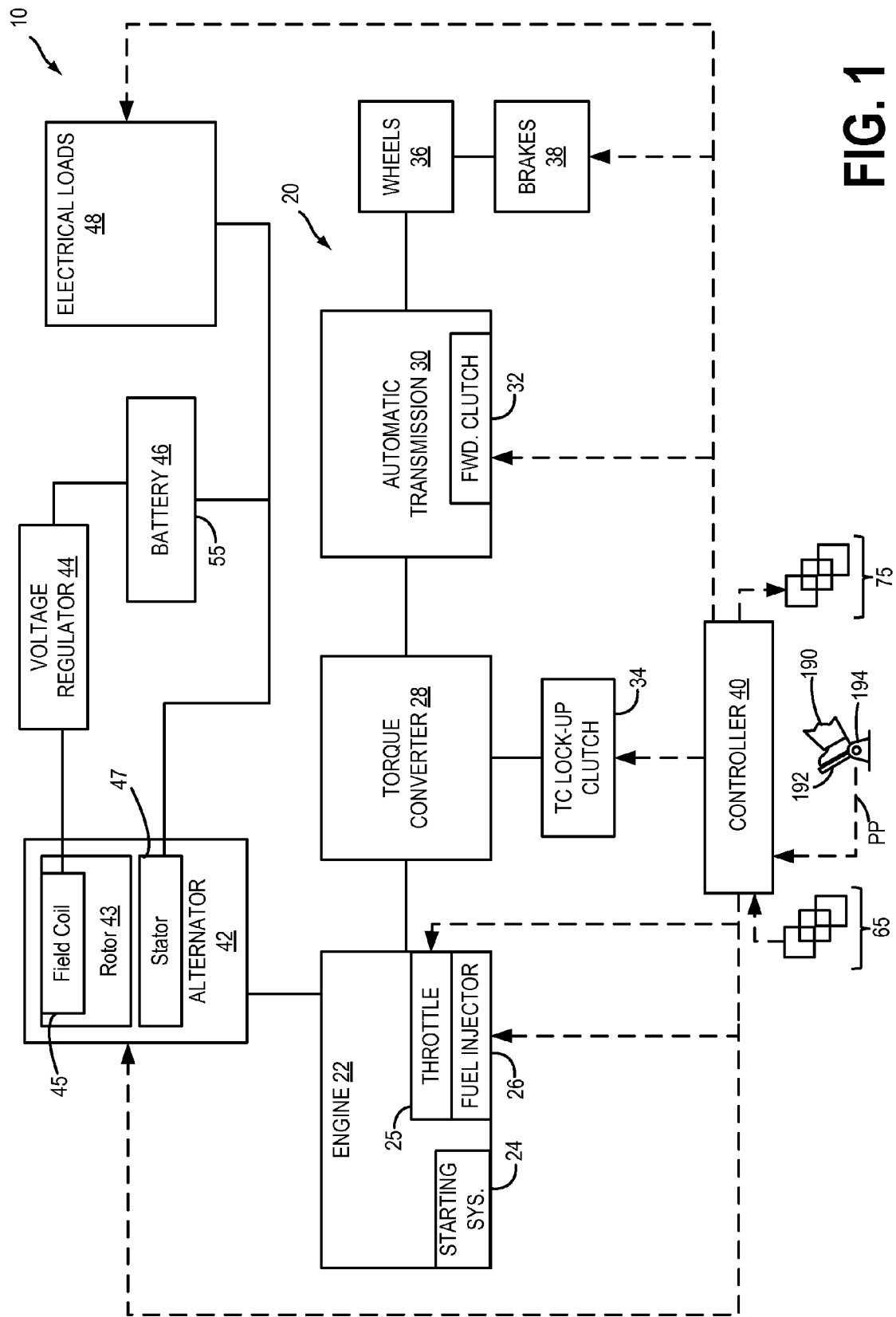
FIG. 1 shows an example vehicle system layout.

The following description relates to system and methods for aiding in the deceleration of a vehicle, and maintaining engine speed during engine idle to within a desired range of engine speeds. A vehicle system, as shown in FIG. 1, may be configured with an alternator that is mechanically coupled to an engine. In one example, a current and/or voltage may be applied to a field coil of the alternator which may generate an alternator output current that may then be used to power various electrical loads (e.g., ancillary electrical devices) and charge the battery. In other examples, the conversion of mechanical to electrical energy may vary from the conventional alternator field control method described above. Additionally, since the alternator is mechanically coupled to the engine, the current applied to the field coil of the alternator may be configured to adjust a load applied to the engine. During vehicle deceleration for example, a voltage and/or current to the field coil may be increased to provide an additional load and braking force to the engine as described in the method of FIG. 4. Increasing the voltage and/or current to the field coil may additionally increase the current output by the alternator which in turn may be used to charge a vehicle battery during deceleration. Once the vehicle has decelerated to a threshold speed, and the engine is put into idle, an engine controller may be configured to perform a control method, such as the method of FIGS. 5A-5B, to control engine speed. During engine idle, unexpected loads may be exerted on the engine, decreasing engine speed. To increase engine speed in response to additional engine loads a throttle of the engine may be adjusted to allow for greater airflow to the engine. However, since it may take time for air to flow from the throttle to engine cylinders, there may be a delay in the response of the engine speed to an increase in intake air flow. Therefore, to provide a faster acting engine torque addition, the ignition timing may be advanced to make the engine more efficient. However, if the ignition timing is advanced past a threshold, engine knock, and engine degradation may occur. As a result, ignition timing may be retarded to an offset value at the onset of engine idle, so that when additional engine torque is required, the ignition timing may be advanced without causing engine knock. Retarding the ignition timing may result in decreased engine efficiency and therefore, increased fuel consumption during engine idle. As shown in the method of FIGS. 5A-5B, however, under certain engine operating conditions, the alternator may be used to increase engine torque during engine idle, thereby eliminating the need for an offset ignition timing. Specifically, the voltage and/or current applied to the field coil may be decreased so that the load exerted on the engine by the alternator may be decreased. Consequently, the fuel efficiency of the engine during engine idle may be improved.

FIG. 1 shows a block diagram layout of a vehicle system 10, including a vehicle drive-train 20. Drive-train 20 may be powered by engine 22. In one example, engine 22 may be a gasoline engine. In alternate examples, other engine configurations may be employed, for example a diesel engine. Engine 22 may be started with an engine starting system 24, including a starter. In one example, the starter may include an electrical motor. The starter may be configured to support engine restart at or below a predetermined near zero threshold speed, for example at or below 50 rpm, or 100 rpm. Torque of engine 22 may be adjusted via torque actuators, such as a fuel injector 26, throttle 25, camshaft (not shown), etc. Specifically, torque of engine 22 may be controlled by adjusting an amount of intake air flowing to the engine via a position of a throttle valve (not shown), an amount of fuel injected to the engine by fuel injector 26, and a spark timing.

An engine output torque may be transmitted to torque converter 28 to drive an automatic transmission 30. In some examples, the torque converter may be referred to as a component of the transmission. The output of the torque converter 28 may be controlled by torque converter lock-up clutch 34. When torque converter lock-up clutch 34 is fully disengaged, torque converter 28 transmits torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter 28 clutch to an input shaft (not shown) of transmission 30. Alternatively, the torque converter lock-up clutch 34 may be partially engaged, thereby enabling the amount of torque relayed to the transmission to be adjusted.

Torque output from the automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels. For example, transmission torque may be transferred to vehicle wheels 36 by engaging one or more clutches, including forward clutch 32. As such, a plurality of such clutches may be engaged, as needed. Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

Vehicle system components outside of the drivetrain may include an alternator 42, a battery 46, and auxiliary loads 48. Auxiliary electrical loads 48 may include: lights, radio system, HVAC systems (for heating and/or cooling a vehicle cabin), seat heater, rear window heaters, cooling fans, etc. Alternator 42 may be configured to convert the mechanical energy generated while running engine 22 to electrical energy for powering the electrical loads 48 and charging the battery 46. Alternator 42 may include a rotor 43, mechanically coupled to the engine 22, and a stator 47 electrically coupled to the battery 46. In a preferred embodiment, the rotor 43 may include a rotor field coil 45, which when electrically energized, may induce current to flow in the stator 47, if the rotor 43 is spinning relative to the stator 47. In other embodiments, the field coil 45 may be included in stator 47, and not the rotor 43. Thus, the output current may be induced in the spinning rotor 43, instead of the stationary stator 47. Thus, in the preferred embodiment, when a voltage is applied to the field coil 45, and the engine 22 is running, a current may be generated in the stator 47. In one embodiment, current to the field coil 45 may be provided by the battery 46. In another embodiment, the alternator 42 may include its own DC generator (not shown) for supplying current to the field coil 45. The voltage and/or current to the field coil 45 may be controlled by a voltage regulator 44. The voltage regulator may be a DC/DC converter (or DC/DC converter based device) for example, configured to output a regulated voltage to the field coil 45. In one example the voltage regulator 44 may be included within the alternator 42. In another example, the voltage regulator 44 may be external to the alternator 42. Thus, the voltage and/or current to the field coil 45, and therefore the current output by the stator 47 may be regulated by the voltage regulator 44. In one example, a voltage command from a controller 40 may be compared to a voltage of a battery by the voltage regulator 44. If the voltage command of the controller 40 differs from the battery voltage, the average voltage and/or current to the field coil 45 may be adjusted to voltage commanded by the controller 40. As an example, if the voltage commanded from the controller is greater than the battery voltage, the voltage and/or current applied to the field coil 45 may be increased, to increase the current output by the stator 47. When current is generated in the stator 47, an electromotive force is exerted on the rotor 43 by the stator 47, which opposes the rotational motion of the rotor 43. As such, when a voltage is applied to the alternator field coil 45, a load is applied on the engine 22. In one example, decreasing the voltage and or current applied to the field coil 45 may decrease the current output by the alternator 42 and decrease the load applied to the engine 22. Thus, the load applied to the engine 22 may be adjusted by increasing or decreasing the voltage and/or current applied to the field coil 45 of the alternator 42. As will be discussed in greater detail below with reference to FIGS. 5A and 5B, the speed of the engine during idle may be increased by decreasing the voltage supplied to the field coil 45.

In one example, as depicted, engine 22 may be configured to be selectively (and automatically) shut down when idle-stop conditions are met and restarted when restart conditions are met. One or more auxiliary loads may be maintained, for example, at 12V, even when the engine is off. The power to maintain the auxiliary loads operational when the engine is shut down may be provided, at least in part, by battery 46.

Vehicle system 10 may be controlled at least partially by a controller 40 and by input from a vehicle operator 190 via an input device 192. In this example, input device 192 includes an accelerator pedal and a brake pedal. Additionally, a pedal position sensor 194 is included in the input device 192 for generating a proportional pedal position signal PP. Controller 40 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 40 may be configured to receive information from a plurality of sensors 65 and to send control signals to a plurality of actuators 75 (various examples of which are described herein). Other actuators, such as a variety of additional valves and throttles, may be coupled to various locations in the vehicle system 10. Controller 40 may receive input data from the various sensors, process the input data, and trigger the actuators in response to the processed input data based on instruction or code programmed therein corresponding to one or more routines. Example control routines are described herein with regard to FIGS. 3-5B.

As elaborated in FIG. 5, controller 40 may be configured to vary a voltage or current applied to the alternator field coil 45 to thereby adjust the mechanical load applied to the engine via the alternator 42 during the engine start and/or idle. By varying the alternator field voltage or current, it is possible to change the load that the alternator applies to the engine during a start and/or idle so that alternator load can be varied according to control parameters that are not strictly dependent on engine speed. For example, alternator field voltage or current can be adjusted to compensate for engine friction that is related to engine temperature. Alternatively, the controller 40 can provide a predictable consistent amount of mechanical load on the engine by substantially maintaining a constant voltage to the alternator field coil circuit. However, it should be noted that field current and load provided by the alternator to the engine are not constant when a constant voltage is applied to the alternator field. Rather, when a constant voltage is applied to the alternator field coil the alternator field current changes with the angular velocity of the rotor. Thus, the current output by the stator 47, depends on both the voltage and/or current applied to the field coil 45 and the speed of the engine 22. The load applied to the engine 22 by the alternator 42 depends on the voltage and/or current applied to the field coil 45.

Controller 40 may be configured to receive inputs from engine 22 and accordingly adjust a mechanical load applied to the engine via the alternator by adjusting voltage or current supplied to the alternator field coil 45. As one example, during engine idle, the controller may adjust a voltage or current supplied to the alternator field coil based on a difference between actual engine speed and a desired engine speed profile. By adjusting the field coil 45 voltage or current an intensity of a magnetic field produced by the field coil 45 in the alternator rotor 43 can be adjusted so that it becomes more or less difficult to rotate the rotor 43 of the alternator 42. In this way, it is possible to adjust a load applied to an engine 22 via an alternator mechanically coupled to the engine during engine idle so that engine speed can be controlled to a desired engine speed.

Controller 40 may also adjust an engine torque output by adjusting a combination of spark timing (also referred to herein as ignition timing), fuel pulse width, fuel pulse timing, and/or air charge, by controlling throttle opening and/or valve timing, valve lift and boost for turbo- or super-charged engines. In the case of a diesel engine, controller 40 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied (e.g., when the vehicle is idling and engine operating parameters are within a desired range), controller 40 may selectively shut down the engine, for example, by controlling operation of drivetrain and/or accessory components. Similarly, when engine restart conditions are met, such as when the vehicle is already in an idle-stop and one or more engine operating parameters are outside the desired range, controller 40 may selectively restart the engine by powering the starter using a battery. Further, controller 40 may use engine torque actuators (e.g., throttle 25 and fuel injector 26) along with making adjustments to current supplied to an alternator field coil 45 to control engine speed during engine idling. By controlling engine torque actuators and the load applied to the engine 22 via the alternator 42 it may be possible to control the speed of the engine 22 to within a desired range during idle.

Figure 2:
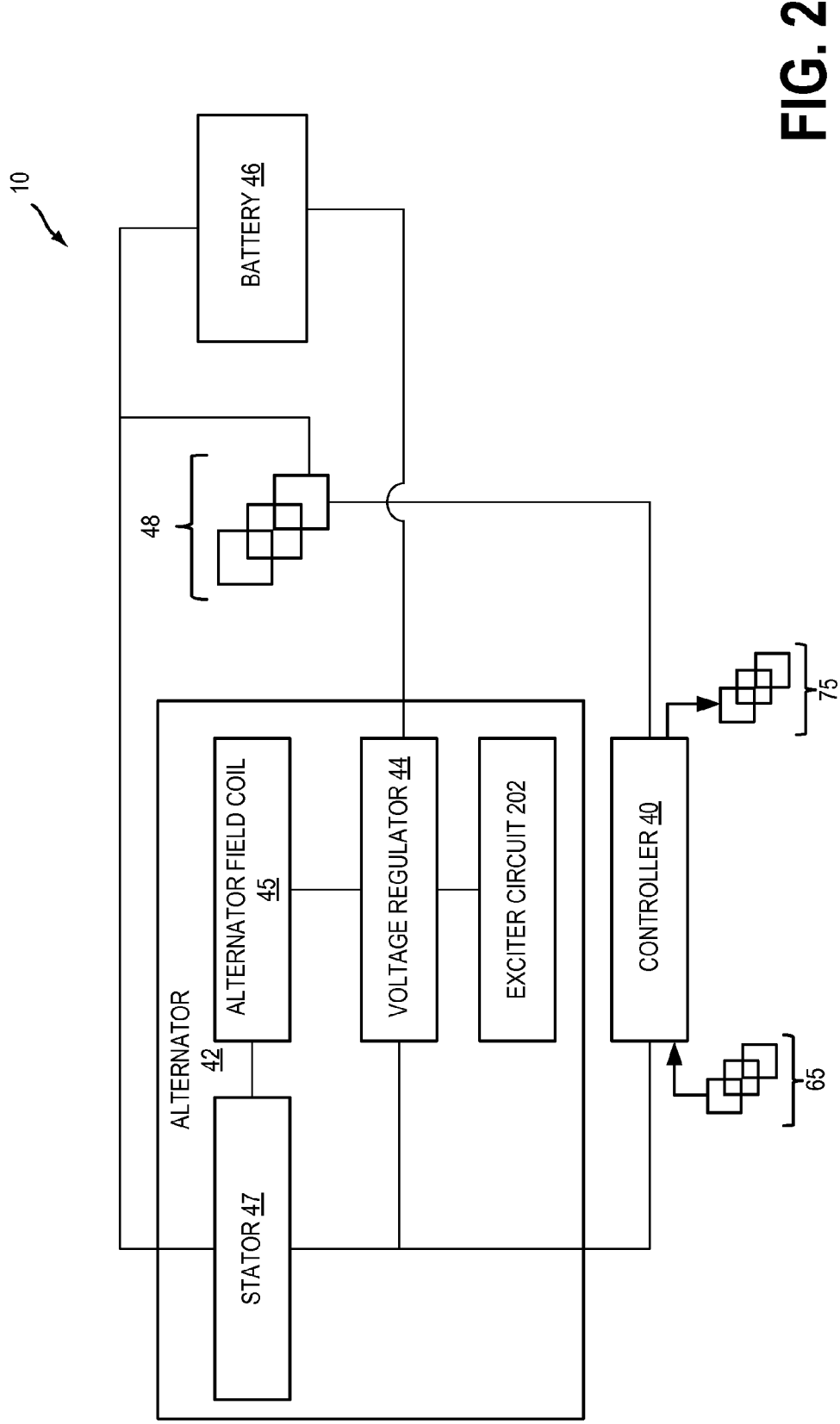
FIG. 2 shows an example electrical circuit for the vehicle system shown in FIG. 1.

Turning to FIG. 2, a block diagram layout of an example electrical system of vehicle system 10 from FIG. 1 is shown. Components of the vehicle system 10 shown in FIG. 2 may be the same as the components shown in FIG. 1. Thus, the components of the vehicle system 10 described above with reference to FIG. 1 may not be described in detail again below. All connecting lines shown in FIG. 2 represent electrical connections. As such, any components of vehicle system 10 shown coupled to one another may be directly electrically connected to one another.

Controller 40 may be configured to receive information from a plurality of sensors 65 and to send control signals to a plurality of actuators 75 (various examples of which are described herein). Other actuators, such as a variety of additional valves and throttles, may be coupled to various locations in the vehicle system 10. The controller 40 may be in electric communication with the stator 47, electrical loads 48 and voltage regulator 44. The electrical loads 48 may include ancillary electrical devices such as pumps, heaters, fans, radio, power steering, etc. In other examples, the controller 40 may be electrically coupled to the battery 46 and may be powered by the battery 46. In still further examples, the controller 40 may have its own power source. The voltage regulator 44 may be electrically coupled to the stator 47 of alternator 42, and the battery 46 for sensing voltages output by the stator 47 and battery 46, and relaying the sensed voltages to the controller 40. Controller 40 may send signals to the voltage regulator 44 to adjust the voltage and/or current to the alternator field coil 45. In one example, the alternator 42 may include its own exciter circuit 202 which may supply the voltage to the field coil 42. The exciter circuit 202 may be a DC generator or other DC current power source. In another example, the voltage for the field coil 45 may be supplied from the battery 46.

When an engine is spinning (e.g., engine 22), and voltage is applied to the alternator field coil 45, an alternating magnetic field may be produced by the field coil 45, which may induce current to flow in the stator 47. The stator 47 may comprise coil windings, configured to output current to power the electrical loads 48, and charge the battery 46. During engine operation, the voltage and/or current to the alternator field coil 45 may be modulated by commands from the controller 40 to the voltage regulator 44 depending on the current demands of the battery 46 and electrical loads 48. As an example, if the controller 40 determines that the current and/or voltage output by the alternator 42 exceeds the current and/or voltage draw from the battery 46 and electrical loads 48, then the controller may signal to the voltage regulator 44 to reduce the voltage and/or current to the field coil 45. In another example, if the controller 40 determines that the current output by the alternator 42 is less than the currents demands of the electrical loads 48, the controller may signal to the voltage regulator to increase the voltage and/or current to the field coil 45. Said another way, the voltage regulator 44, may vary a current applied to the field coil 45 to produce a constant voltage in the current output by the alternator 42. In some examples, the battery 46 may also be used to supplement electrical power output from the alternator 42, if the current demand from the electrical loads 48 is greater than the current output by the alternator 42. Said another way, the battery 46 may supply additional electrical power to the electrical loads 48 if the current demand from the electrical loads 48 exceeds the current output by the alternator 42. Thus, in some examples, the controller may sense battery current and control the current and/or voltage applied to the field coil 45 to achieve a constant state of charge on the battery 46.

During engine idle, a voltage sufficient to power all of the electrical loads 48 of the vehicle system 10 may continue to be applied to the field coil 45. In other examples, at engine idle, a voltage sufficient to power all of the electrical loads 48 and charge the battery 46 of the vehicle system 10 may be applied to the field coil 45. In still further examples, at engine idle, a voltage sufficient to charge the battery 46 but not all of the electrical loads 48 of the vehicle system 10 may be applied to the field coil 45. In other examples, the current applied to the field coil 45 may drop to approximately zero during engine idle, and the battery 46 may be used to supply all of the electrical power needs of the electrical loads. As will be discussed in greater detail below with reference to FIGS. 5A-5B, under certain engine operating conditions at engine idle, the voltage and/or current to the alternator field coil 45 may be significantly reduced or interrupted completely (e.g., cut to 0V), such that a load applied to the engine (e.g., engine 22) by the alternator 42 may be reduced. Thus, controller 40 may receive signals relating to the charge state of the battery 46, power demands from the electrical loads 48, and current output from the stator 47 of alternator 42. Additionally, the controller 40 may estimate and/or measure engine operating conditions based on feedback from a plurality of sensors 65. In this way, controller 40 may adjust the voltage and/or current to the alternator field coil 45, and thereby the current output by the alternator 42, based on engine operating conditions, power demands from the electrical loads 48 and the charge state of battery 46.

Figure 3:
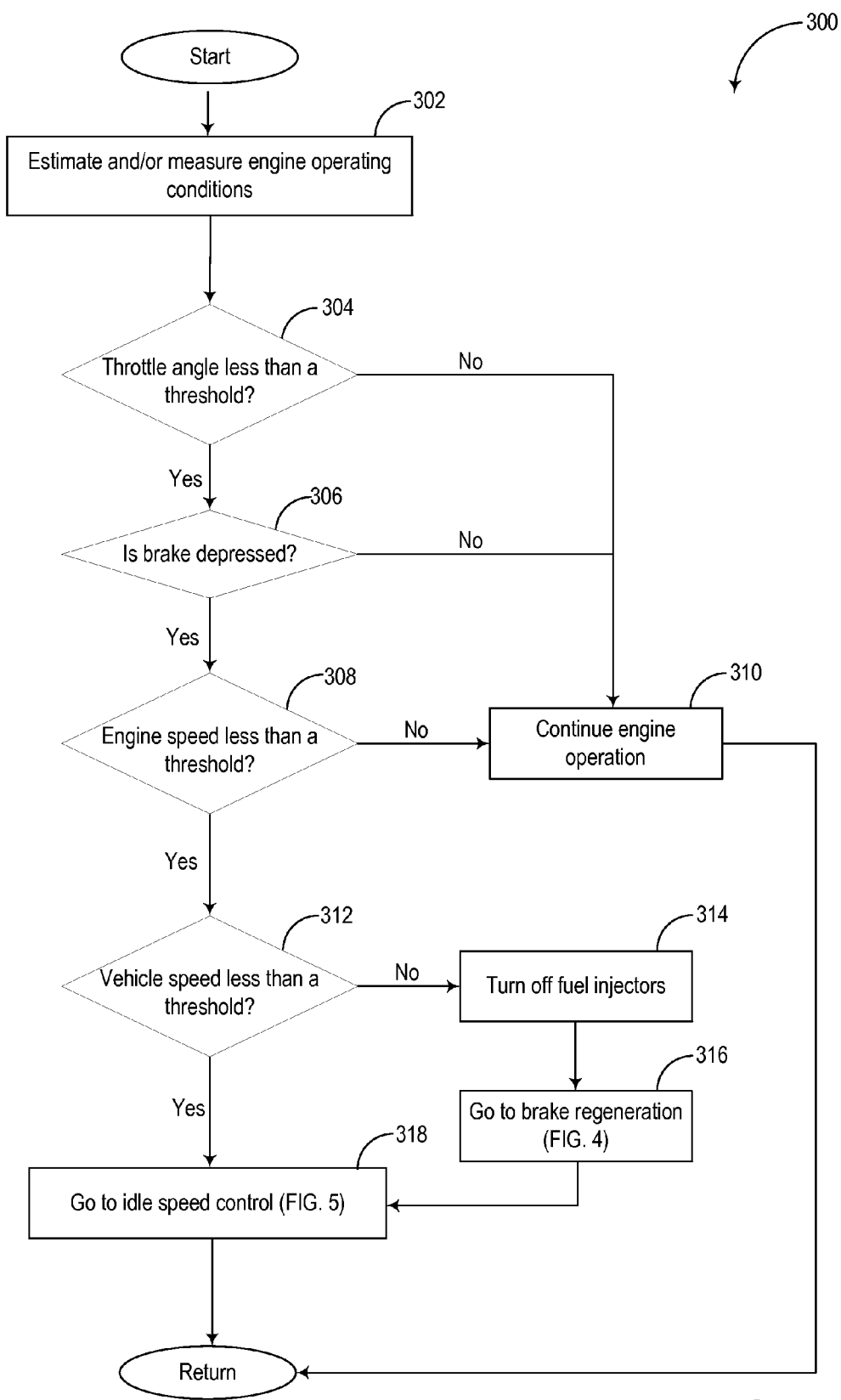
FIG. 3 shows a high level flow chart of a method for decelerating a vehicle.

FIG. 3 shows a flow chart of a method 300 for entering engine idle during deceleration of a motor vehicle (e.g., vehicle system 10). Instructions for carrying out method 300 may be stored in a memory of an engine controller such as controller 40 shown in FIGS. 1-2. Further, method 300 may be executed by the controller. Method 300 begins at 302 and the controller (e.g. controller 40) estimates and/or measures engine operating conditions based on feedback from a plurality of sensors (e.g., sensors 65). Engine operating conditions may include, engine speed and load, intake mass air flow, manifold pressure, a position of a throttle valve, a position of a brake pedal, engine temperature, etc.

After estimating and/or measuring engine operating conditions the controller may proceed to 304 and determine if the throttle angle is less than a threshold. The threshold may be a threshold angle that is pre-set and stored in the memory of the controller. Further the threshold may be based on a known relationship between the throttle angle, barometric pressure, and mass air flow in an intake system of the vehicle. Thus, the throttle angle may be used by the controller to estimate an amount of intake air flowing in the engine (e.g., engine 22). In one example, the throttle (e.g., throttle 25) may include a valve which regulates air flow into the engine. If the controller determines at 304 that the throttle angle is greater than a threshold at 304, the controller may continue to 310 and continue engine operation based on engine operating parameters and input from a user (e.g., vehicle operator 190) via an accelerator pedal or brake pedal (e.g., input device 192). Thus, at 310, the controller may adjust engine operating parameters such as the throttle angle, fuel injection amount, and alternator load, based on input from a user.

However, if the controller determines at 304 that the angle of the throttle valve, and thus the amount of intake air flowing to the engine, is less than a threshold, the controller may proceed to 306 and determine if the brake (e.g., brake pedal of input device 192) is depressed. The controller may determine that the brake is depressed based on the position of the brake as measured by a position sensor (e.g., pedal position sensor 194). In one example, if the position of the brake pedal reaches a threshold, the controller may determine that the brake is depressed. In another example, any change in the position of the brake may be registered by the controller as the brake being depressed. If, the controller determines that the brake is not depressed, then the controller may continue to 310 and continue engine operation as discussed above. Method 300 may then return from 310. On the other hand, if the controller determines that the brake has been depressed at 306, method 300 may continue to 308 and the controller may determine if engine speed is less than a threshold. The threshold engine speed may a pre-set speed stored in the memory of the controller. In other examples, the threshold engine speed may be calibrated by the controller based on engine operating conditions. The controller may determine the engine speed from a sensor in the engine such as a Hall Effect sensor. If the controller determines that the engine speed is greater than the threshold engine speed, then the controller may proceed to 310 and continue engine operation as discussed in greater detail above. However, if the controller determines that the engine speed is less than the threshold engine speed at 308, the controller may proceed to 312 and determine if the vehicle speed is less than a threshold. The threshold at 312 may be a speed threshold value that is pre-set and stored in the memory of the controller. In other examples, the speed threshold may be a value calibrated by the controller based on engine operating conditions. The controller may estimate the vehicle speed from a sensor such as a Hall Effect sensor. If the controller determines that the vehicle speed is less than the threshold speed at 312, then method 300 may continue to 318 and the controller may go to an engine idle speed control routine as discussed in greater detail with reference to FIG. 5. Specifically, the engine idle speed control routine may include maintaining engine speed at a desired speed during engine idle.

However, if at 312 the controller determines that the vehicle speed is greater than the threshold speed, the controller may turn off fuel injectors (e.g., fuel injector 26) at 314. Thus, in an effort to decelerate the vehicle while reducing fuel consumption, the controller may signal to the fuel injectors to no longer inject fuel to engine cylinders. To further aid in decelerating the vehicle, the controller may continue from 314 and go to brake regeneration at 316 which will be discussed in greater detail below with reference to FIG. 4. Specifically, the controller may signal to a voltage regulator (e.g., voltage regulator 44) to increase the voltage and/or current to a field coil (e.g., alternator field coil 45) of an alternator (e.g., alternator 42) such that the load applied to the engine by the alternator is increased. The increased load on the engine may aid in the deceleration of the vehicle. Once the controller has completed the brake regeneration routine at 316, and the vehicle speed is less than a threshold, method 300 may continue to 318, and the controller may go to engine idle speed control. Thus, the controller may enter the engine idle speed control routine directly from 312 if the vehicle speed is less than a threshold. However, the controller may proceed to 314 and 316 to reduce the speed of the vehicle before entering engine idle speed control if the vehicle speed is greater than the threshold at 312. Method 300 may then return.

Figure 4:
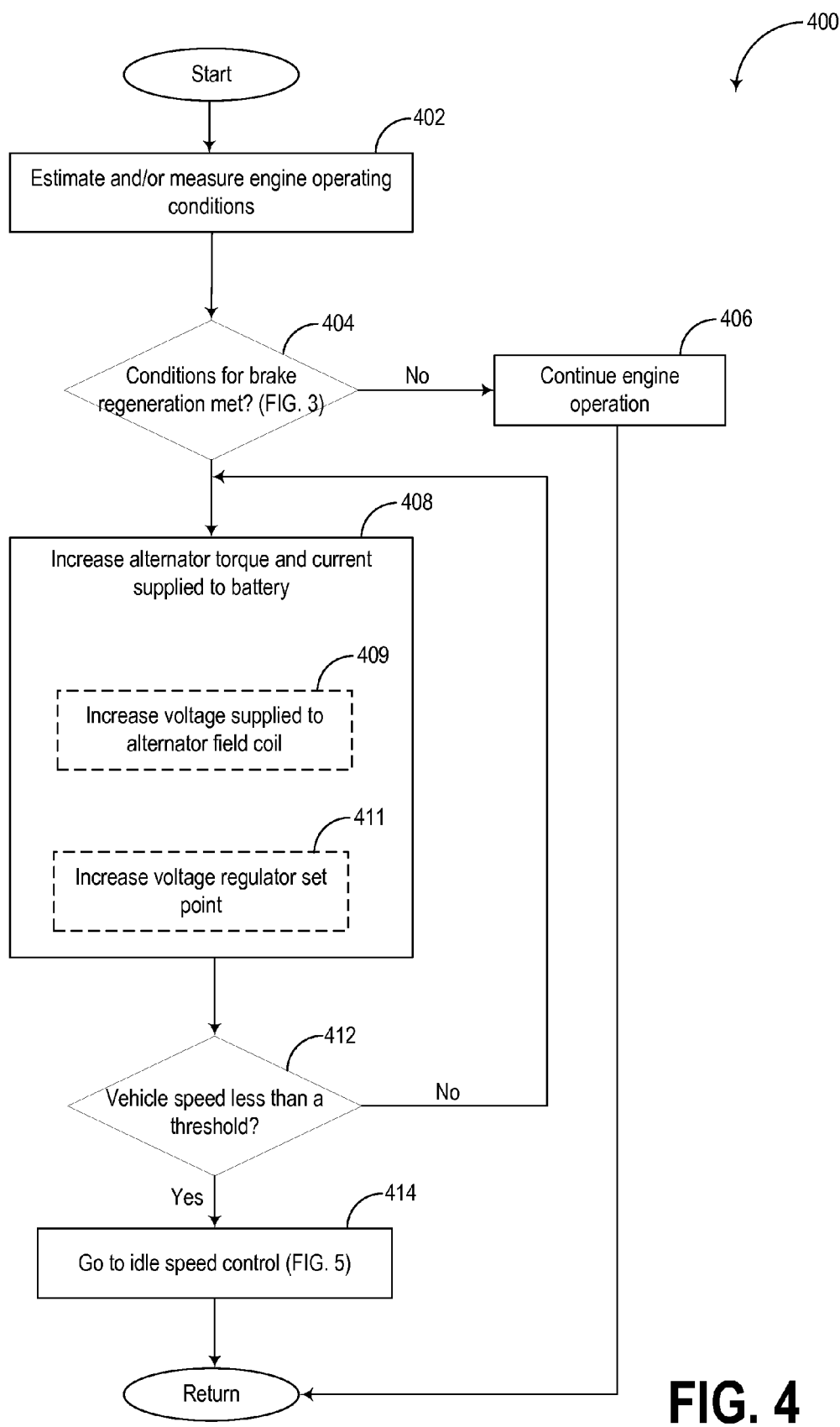
FIG. 4 shows a flow chart of a method for providing a braking force to a vehicle using an alternator.
Figure 5A:
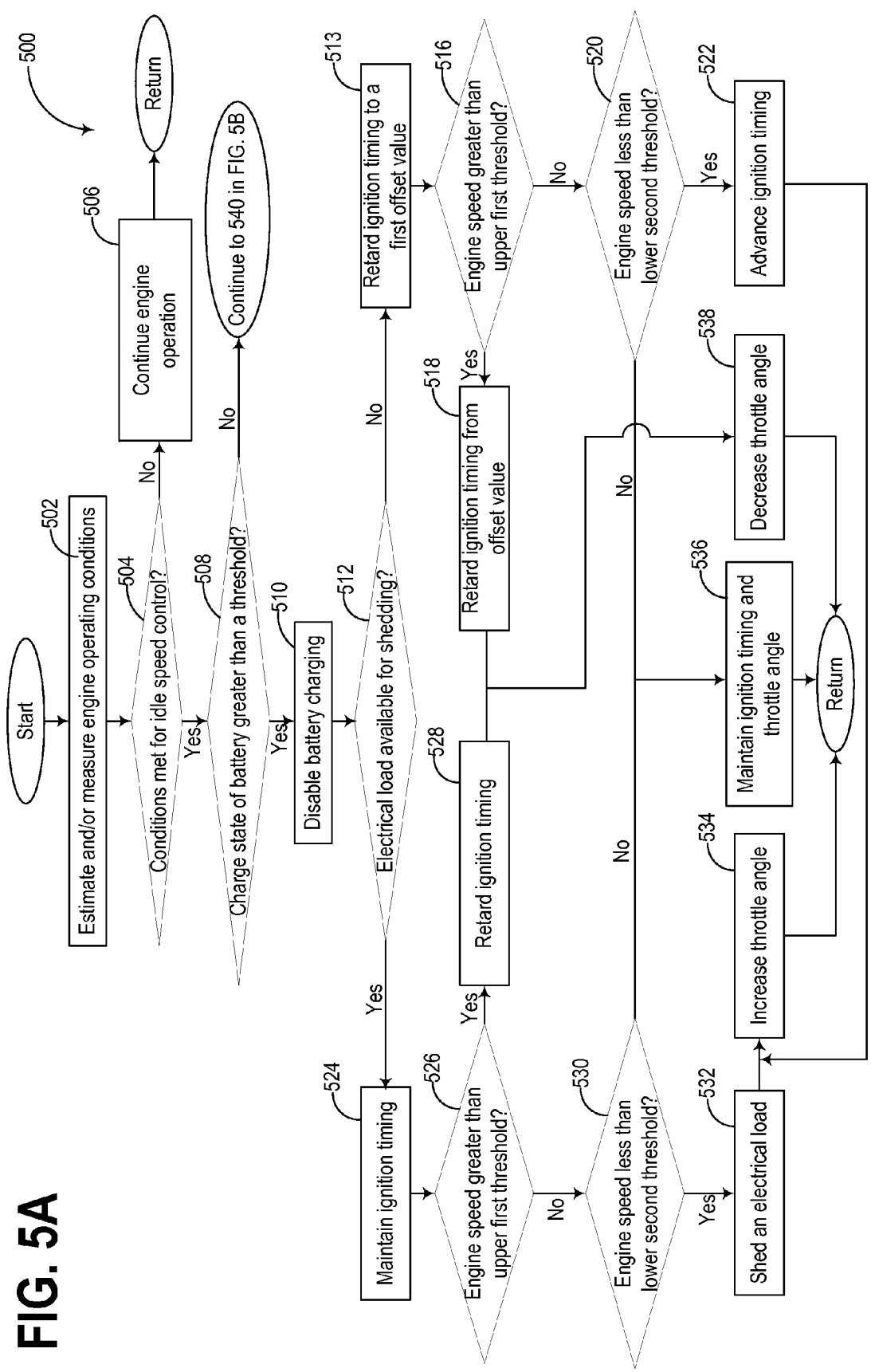
FIGS. 5A-5B show flow charts of a method for engine idle speed control.
Figure 5B:
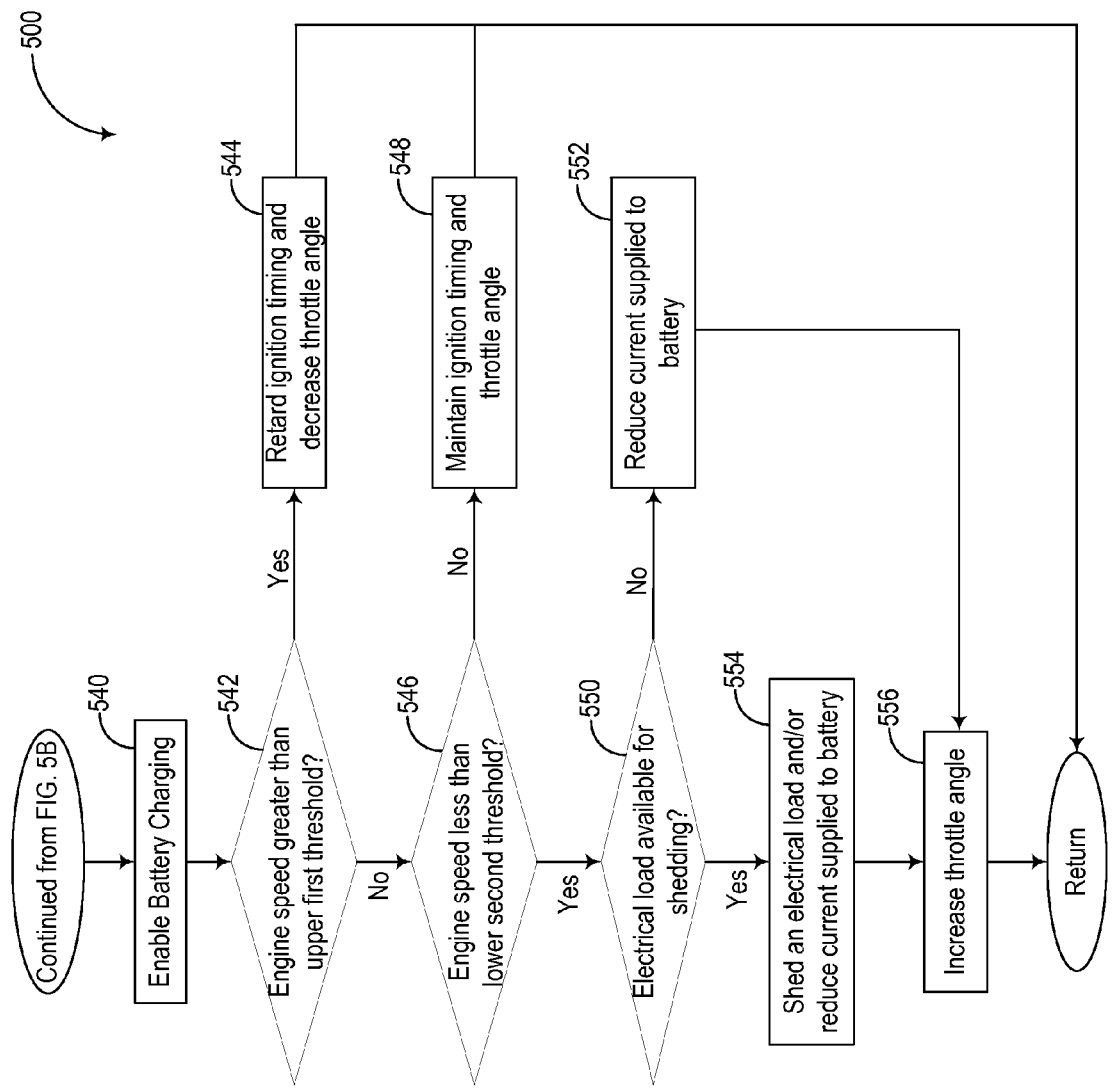

Turning now to FIG. 4, a flow chart of a method 400 for conducting a brake regeneration routine is shown. Specifically, method 400 may include applying an additional brake force to that of the vehicle brakes (e.g., brakes 38) on the engine (e.g., engine 22) by increasing the alternator torque exerted on the engine. Instructions for carrying out method 400 may be stored in a memory of an engine controller such as controller 40 shown in FIGS. 1-2. Further, method 400 may be executed by the controller. It is important to note that method 400 may continue from the method 300 as discussed above with reference to FIG. 3. More specifically, method 400 may comprise the brake regeneration routine discussed at 316 in method 300.

Method 400 begins at 402 and the controller (e.g., controller 40) estimates and/or measures engine operating conditions based on feedback from a plurality of sensors (e.g., sensors 65). Engine operating conditions may include, engine speed and load, intake mass air flow, manifold pressure, a position of a throttle valve, a position of a brake pedal, engine temperature, etc. After estimating and/or measuring engine operating conditions at 402, method 400 may continue to 404 and the controller may determine if the conditions for brake regeneration have been met. As discussed in greater detail above with reference to FIG. 3, the conditions for brake regeneration may include: throttle angle and engine speed being less than a threshold, vehicle speed being greater than a threshold, a vehicle brake having been depressed by a user, etc. If the controller determines that the conditions for brake regeneration have not been satisfied at 404, controller may proceed to 406 and continue engine operation. Specifically, the controller may adjust engine operation based on engine operating parameters and input from a vehicle operator (e.g., vehicle operator 190) via a brake pedal and/or accelerator pedal (e.g., input device 192). However, if the controller determines that the conditions for brake regeneration have been met at 404, method 400 may proceed to 408 and the controller may increase alternator torque and current supplied to a battery (e.g., battery 46). As discussed above with reference to FIG. 1, a rotor (e.g., rotor 43) of an alternator (e.g., alternator 42) may be mechanically coupled to an engine (e.g., engine 22). As such, increasing the alternator torque may increase a load applied on the engine by the alternator, thereby providing a braking force to a vehicle system (e.g., vehicle system 10).

The controller may increase alternator torque by proceeding to one or more optional steps 409 and 411. In one example, the controller may increase the voltage supplied to an alternator field coil (e.g., alternator field coil 45) at 409, thereby increasing the strength of the magnetic field generated by the field coil the alternator torque. In another example, the controller may increase the set point of a voltage regulator (e.g., voltage regulator 44) at 411. Increasing the set point of the voltage regulator may increase the desired current output from the alternator. The voltage regulator may in turn increase the voltage supplied to the alternator field coil to bring about a resulting increase in the current output by the alternator. Thus, the controller may send a signal to the voltage regulator at 408 to increase the voltage and/or current to the alternator field coil. As a result of the increase in alternator field coil voltage, the load applied to the engine may increase thereby slowing down the vehicle system, and the current output of the alternator may increase. The increased electrical power output from the alternator at 408 may be directed by the controller to charge the battery. Therefore, method 400 may not only be used to provide a braking force to the vehicle via an increase in alternator torque, but it may also be used to charge the battery during vehicle deceleration so that the demand for battery charging at engine idle may be reduced.

After increasing alternator torque and current supplied to the battery at 408, the controller may continue to 412 and determine if vehicle speed is less than a threshold speed. The threshold at 412 may be a speed threshold value below which the engine is put into idle such that torque from the engine may not be transferred to the wheels (e.g., wheels 36) of the vehicle system. The speed threshold may pre-set and stored in the memory of the controller. In other examples, the speed threshold may be a value calibrated by the controller based on engine operating conditions. The controller may estimate the vehicle speed from a sensor such as a Hall Effect sensor. If the controller determines that the vehicle speed is not below the threshold at 412, then the controller may return to 408 and increase alternator torque in an effort to further slow the vehicle down to the threshold speed. Thus, in one example, controller 40 may continue to increase alternator torque until the vehicle speed is below the threshold speed at 412. In other examples, an upper threshold of alternator torque may be pre-set and stored in the memory of the controller, such that the alternator torque may not exceed the upper threshold at 408. If at 412, the controller determines that the vehicle speed is less than the threshold speed, then the controller may go to idle speed control at 414 as discussed in greater detail below with reference to FIGS. 5A-5B. Method 400 may then return.

Turning to FIGS. 5A-5B flow charts of a method 500 for conducting an engine idle speed control routine are shown. During engine idle, the speed of the engine may be maintained at a pre-selected speed, or to within a pre-selected range of speeds. The spark timing (also referred to herein as the ignition timing), may be retarded to decrease the efficiency of the engine (e.g., engine 22), so that if engine speed drops below the acceptable range of engine speeds during idle the spark timing may be advanced to make the engine more efficient and therefore increase the engine speed. The ignition timing may be retarded during idle to an offset value, because if the ignition timing is advanced beyond a threshold, engine knock and degradation to the engine may occur. However, retarding the ignition timing, and thereby making the engine less efficient, increases the fuel consumption of the engine during idle. Method 500 provides for an engine idle speed control that may reduce the fuel consumption of the engine during idle as compared to retarding the ignition timing. Specifically, under certain engine operating conditions, method 500 comprises reducing the alternator torque exerted on the engine, to increase engine speed.

Instructions for carrying out method 500 may be stored in a memory of an engine controller such as controller 40 shown in FIGS. 1-2. Further, method 500 may be executed by the controller. Method 500 begins at 502 and the controller (e.g., controller 40) estimates and/or measures engine operating conditions based on feedback from a plurality of sensors (e.g., sensors 65). Engine operating conditions may include, engine speed and load, intake mass air flow, manifold pressure, a position of a throttle valve, a position of a brake pedal, engine temperature, etc. After estimating and/or measuring engine operating conditions at 502, method 500 may continue to 504 and the controller may determine if the conditions for idle speed control have been met. As discussed in greater detail above with reference to FIGS. 3-4, the conditions for idle speed control may include: throttle angle and engine speed being less than a threshold, vehicle speed being less than a threshold, a vehicle brake having been depressed by a user, etc.

If the controller determines that the conditions have not been met for idle speed control (e.g., engine speed is not below a threshold), then the controller may proceed to 506 and continue engine operation. Specifically at 506, the controller may adjust engine operation based on engine operating parameters and input from a vehicle operator (e.g., vehicle operator 190) via a brake pedal and/or accelerator pedal (e.g., input device 192). The method may then return. However, if at 504, the controller determines that the conditions have been met for engine idle speed control, then the controller may subsequently determine if the charge state of a battery (e.g., battery 46) is greater than a threshold at 508. In one example, the controller may estimate and/or measure the charge state of the battery via signal outputs from a voltage regulator (e.g., voltage regulator 44) that senses the voltage drop across the battery terminals. The threshold battery charge state may be a pre-set threshold stored in the memory of the controller, above which the battery may be fully charged, and below which the battery may be charged. Thus, in one example, if the battery charge is greater than the threshold at 508, the battery may not accept additional current from an alternator (e.g., alternator 42) because it may be fully charged. In other examples, the threshold may represent a charge state of the battery, where the battery is nearly fully charged. If the controller determines that the charge state of the battery is not greater than a threshold, method 500 may continue to 540 in FIG. 5B and allow for battery charging during idle. Otherwise, if the controller determines that the charge state of the battery is greater than a threshold, and the battery may not need to be charged, then the controller may subsequently disable battery charging at 510. Disabling battery charging may include, reducing or completely discontinuing current flow from an alternator (e.g., alternator 42) to the battery. In one embodiment, the controller may also signal to the voltage regulator to apply a voltage to a field coil (e.g. alternator field coil 45) of the alternator sufficient to only power various ancillary electronics (e.g., electrical loads 48) at 510. Thus, the controller may also reduce the voltage and/or current to field coil at 510, so that the amount of current output by the alternator is sufficient to power electrical devices in the vehicle (e.g., vehicle system 10), but may not be sufficient to also charge the battery.

After disabling battery charging, the controller may continue to 512 and determine if an electrical load, also referred to herein as electrical devices, (e.g., one of electrical loads 48) is available for shedding. In one example, the controller may determine at 512, if a brief reduction in the current supplied to one or more electrical devices may be imperceptible to a user (e.g. vehicle operator 190). In another example, the controller may determine at 512, if stopping current flow to one or more electrical devices may be imperceptible to a user. The electrical loads may include one or more ancillary electronics such as: water pumps, heaters, air conditioners, fans, radio, lights, heated rear window, heated steering wheel, heated shift knob, heated front window, etc. As an example, momentarily reducing power supplied to heated rear window may be imperceptible to a user.

In another embodiment, the availability for shedding of an electrical load may also be based on the charge state of the battery. For example, if the charge state of the battery is high, the battery may be used as a power source in addition to the alternator for power various electrical loads.

If the controller determines that an electrical load is not available to be shed at 512, then the controller may subsequently retard the ignition timing to a first offset value at 513. The first offset value may be pre-set and stored in the memory of the controller, and may be based on a known relationship between ignition timing, and engine efficiency. In other examples, the offset ignition timing may be calibrated by the controller and based on current engine operating conditions. After retarding the ignition timing at 513, the controller may continue to 516 and determine if the engine speed is greater than an upper first threshold. The controller may estimate the engine speed based on feedback from a Hall Effect sensor, or other sensor capable of measuring rotational speeds. In one example, the upper first threshold may be an engine speed that may be pre-set and stored in the memory of the controller. The first threshold may represent a maximum desired engine idle speed, above which may result in excess fuel consumption. In another example, the upper first threshold may be a rate of increase in engine speed. Thus, at 516, the controller may determine if the rate of increase in engine speed is greater than the upper threshold. If the controller determines that the engine speed is greater than the upper first threshold at 516, then the controller may proceed to 518 and retard the ignition timing from the first offset value to a second offset value, where the second offset value may be more retarded than the first offset value. The controller may adjust the ignition timing by sending appropriate signals to spark plugs in engine cylinders. Subsequently, the controller may proceed to 538 and decrease the throttle angle. Thus, the controller may move the throttle towards a closed position at 538 to reduce or stop airflow to the engine. In one example, the controller may decrease the angle of a valve positioned in the throttle (e.g., throttle 25) to decrease intake air flowing in the engine. In another example the valve may be solenoid valve that may be adjusted based on signals from the controller. Decreasing the throttle angle, and retarding the ignition timing may both decrease the engine speed. Thus, the controller may execute 518 and 538 to decrease the engine speed. In other examples, the controller may execute 518 and 538 simultaneously. In still further example, the controller may execute 518 before executing 538.

If at 516, the controller determines that the engine speed is less than the upper first threshold, then the controller may subsequently determine if the engine speed is less than a lower second threshold at 520. The lower second threshold may be an engine speed that may be pre-set and stored in the memory of the controller. The second threshold may be less than the first threshold. Further, in one example, the second threshold may represent a minimum desired engine idle speed, below which may result in engine stall. In another example, the second threshold may be a rate of decrease in engine speed. Thus, in another example, at 520, the controller may determine if the engine speed is decreasing at a rate greater than the second threshold. If the controller determines that engine speed is less than the second threshold, then the controller may advance the ignition timing from the first offset value at 522, and subsequently increase the throttle angle at 534. Thus, the controller may move the throttle toward an open position at 534, so that airflow to the engine may be increased. As discussed above, the throttle angle may be adjusted by adjusting a valve positioned in the throttle. Specifically at 534, the valve may be moved to an open position. Specifically, the throttle angle may be increased such that the amount of air flowing through the engine may increase. The controller may maintain the increased throttle angle until engine speed increases above the lower second threshold. Thus, the duration of the increase in throttle angle may be based on the time it takes for the engine speed to increase above the lower second threshold.

In one example, the controller may advance the ignition timing back to the same or relatively the same ignition timing before 513 and the retarding to the first offset ignition timing. In other examples, the ignition timing may be advanced to an ignition timing still retarded from the ignition timing before 513. Further, in one embodiment, the controller may execute 522 and 534 simultaneously. In still other embodiments, the controller may increase the throttle angle at 534 before advancing the ignition timing at 522. Advancing the ignition timing and increasing the throttle angle may increase the speed of the engine. If the controller determines that the engine speed is greater than the lower second threshold at 520, then method 500 may proceed to 536 and the controller may maintain the ignition timing and throttle angle. Thus, if the engine speed is greater than the lower second threshold, then the engine speed may be within the lower second and upper first thresholds. As such, the engine speed may be within a desired range of speeds during engine idle and so the controller may not adjust the ignition timing or throttle angle from current ignition timing and throttle angle.

Returning to 512, if the controller determines that an electrical load is available for shedding at 512, then the controller may proceed to 524 and maintain the current ignition timing. As such, the efficiency of the engine during engine idle may be retained at 524. Subsequently, the controller may continue to 526 and determine if the engine speed is greater than the upper first threshold. The upper first threshold at 526 may be the same upper first threshold as discussed above at 516. If it is determined that the engine speed is greater than the upper first threshold, then the controller may proceed to 528 and retard the ignition timing at 528. Specifically, the controller may retard the ignition timing from the ignition timing at 524. The retarded ignition timing may be similar to that of the first offset ignition timing discussed above at 513. In one example, the amount the ignition time is retarded may be pre-set and stored in the memory of the controller. In another example, the amount the ignition timing is retarded at 528 may be based on the engine speed. Thus, the greater the engine speed is than the upper first threshold, the more the ignition timing may be retarded. After retarding the ignition timing at 528, the controller may proceed to 538 and decrease the throttle angle. In other examples, the controller may execute 528 and 538 simultaneously. In still further examples, the controller may decrease the throttle angle at 538 before retarding the ignition timing at 528.

However, if at 526, the controller determines that the engine speed is less than the upper first threshold, the controller may proceed to 530 and determine if the engine speed is less than the lower second threshold. The lower second threshold at 530 may be the same lower second threshold as discussed earlier at 520. If the controller determines that the engine speed is greater than the lower second threshold at 520, then method 500 may proceed to 536 and the controller may maintain the ignition timing and throttle angle. Thus, if the engine speed is greater than the lower second threshold, then the engine speed may be within the lower second and upper first thresholds. As such, the engine speed may be within a desired range of speeds during engine idle and so the controller may not adjust the ignition timing or throttle angle from current ignition timing and throttle angle. If the controller determines that the engine speed is less than the lower second threshold, then the controller may proceed to 532 and shed an electrical load (e.g., one of electrical loads 48). The shedding of an electrical load at 532 may comprise reducing, or completely stopping current flow to the one or more electrical devices. Thus in one embodiment, the current to the one or more electrical loads determined at 512 to be available for shedding, may be reduced. In other examples, the current supplied to the one or more electrical loads determined at 512 to be available for shedding may be completely interrupted. As a result of the decrease in current demand from the electrical loads, a voltage regulator (e.g., voltage regulator 44) may reduce a voltage and/or current to a field coil (e.g., alternator field coil 45) of an alternator (e.g., alternator 42), such that the electrical power output by the alternator may decrease. Specifically, in one example, the voltage and/or current to the alternator field coil may be reduced to 0V such that no voltage may be applied to the alternator field coil. In another example, the amount of decrease in the voltage and/or current to the alternator field coil may be determined by the controller based on how much slower the engine speed is than the second threshold. Thus, for greater differences between engine speed and the second threshold, the controller may apply greater voltage reductions to the alternator field coil. The controller may only signal to a voltage regulator (e.g., voltage regulator 44) to reduce the voltage and/or current to the alternator field coil for a brief duration. Specifically the duration of the voltage decrease applied to the alternator field coil at 532 may be less than the duration of the increase in throttle angle at 534. In one example the duration of the voltage reduction to the alternator field coil may be 0.7 seconds. In other examples, the duration of the voltage reduction may be less than 0.7 seconds. In still further examples, the duration of the voltage reduction may be greater than 0.7 seconds. The reduction in the voltage and/or current to the field coil may reduce the torque exerted on the engine by the alternator. As such, reducing current to the one or more electrical loads at 532 may provide an instantaneous, or nearly instantaneous decrease in engine load, and as a result may increase engine speed. The controller may then proceed to 534 and increase the throttle angle. In another example, the controller may execute 532 and 534 simultaneously. In still further examples, the controller may execute 534 before 532. Thus, decreasing the voltage and/or current to the alternator field coil at 532, and increasing the throttle angle may increase engine speed. Engine speed may not increase immediately upon increasing the throttle angle, because it may take time for intake air to travel from the throttle to engine cylinders. Thus, there may be a delay in the increase in engine speed in response to an increase in throttle angle. Therefore to increase engine speed during the delay throttle to engine cylinders, current to one or more electrical loads may be reduced, and as such, the voltage and/or current to the alternator field coil may also be reduced. Thus, shedding the electrical loads at 532 may provide a nearly immediate decrease in engine load and therefore increase in engine speed during the delay period in which engine speed may not increase in response to the increased throttle angle at 534.

It is also important to note, that in other embodiments, the controller may signal for the battery to provide electrical power to the electrical loads at 532. Thus, when the current output by the alternator decreases at 532 due to a reduction in the voltage and/or current to the field coil, the controller may not decrease current supplied to the electrical loads at 532. Instead, current may be drawn from the battery to maintain a steady current and/or voltage supply to the electrical loads during the duration of the decrease in voltage supplied to the field coil at 532.

Turning now to FIG. 5B, method 500 discussed above in FIG. 5A may continue from 508. If the controller determines that the charge state of the battery is less than a threshold at 508, the controller may proceed to 540 and enable battery charging. Specifically, the controller may signal to the voltage regulator to apply a voltage to alternator field coil, sufficient to generate enough current to both power the electrical loads, and charge the battery. Thus, the voltage and/or current to the alternator field coil at 540, may be greater than the voltage and/or current to the alternator field coil at 510, where battery charging is disabled. Subsequently, the controller may continue to 542 and determine if the engine speed is greater than the upper first threshold. The upper first threshold at 542 may be the same upper first threshold as discussed above at 516 and 526. If it is determined that the engine speed is greater than the upper first threshold, then the controller may proceed to retard the ignition timing and decrease the throttle angle at 544 as discussed earlier at 528 and 538. However, if at 542 the engine speed is less than the upper first threshold, the controller may continue to 546 and determine if the engine speed is less than the lower second threshold. The lower second threshold at 546 may be the same lower second threshold as discussed earlier at 520 and 530. If the controller determines that the engine speed is greater than the lower second threshold at 546, then method 500 may proceed to 548 and the controller may maintain the ignition timing and throttle angle as discussed earlier at 536. Thus, if the engine speed is greater than the lower second threshold, then the engine speed may be within the lower second and upper first thresholds. As such, the engine speed may be within a desired range of speeds during engine idle and so the controller may not adjust the ignition timing or throttle angle from current ignition timing and throttle angle.

If the controller determines at 546 that the engine speed is less than the lower second threshold, the controller may proceed to 550 and determine if an electrical load is available for shedding as described earlier at 512. If the controller determines that an electrical load is not available for shedding, then the controller may continue to 552 and reduce the current supplied to the battery from the alternator. More specifically, the controller may signal to the voltage regulator to reduce the voltage and/or current to the alternator field coil. As a result the current output by the alternator may be reduced. The voltage and/or current to the field coil may not be reduced past a threshold voltage sufficient to generate enough current in the alternator to power the electrical loads. Due to the decrease in current generated by the alternator, current to the battery may be reduced. In one example, current provided to the battery by the alternator may be interrupted completely at 552. As such, battery charging may cease at 552, and current generated by the alternator at 552 may only be sufficient to power ancillary electronics in the vehicle. The reduction in voltage and/or current to the voltage regulator (e.g., voltage regulator 44) may only persist for a relatively brief duration. In one example, the duration of the voltage reduction to the alternator field coil may be 0.7 seconds. In other examples, the duration of the voltage reduction may be less than 0.7 seconds. In still further examples, the duration of the voltage reduction may be greater than 0.7 seconds. The reduction in the voltage and/or current to the field coil may reduce the torque exerted on the engine by the alternator. As such, shedding the current supplied to the battery at 552 may provide an instantaneous, or nearly instantaneous decrease in engine load, and as a result may increase engine speed. However, current to the ancillary electrical devices may not be reduced. After reducing the voltage and/or current to the alternator field coil, and current supplied to the battery at 552, the controller may proceed to 556 and increase the throttle angle as discussed earlier at 534. The controller may maintain the increase throttle angle until engine speed increases above the lower second threshold. Further, the duration of the decrease in voltage and/or current to the alternator field coil and current supplied to the battery at 552 may be less than the duration of the increase in throttle angle at 556.

If the controller determines that an electrical load is available for shedding at 550, then the controller may continue to 554 and shed an electrical load, and/or reduce current supplied to the battery. Thus, the controller may signal to the voltage regulator at 554 to reduce the voltage and/or current to the alternator field coil, so that the current output by the alternator, and the load exerted on the engine by the alternator may be reduced. In one example, the decrease in voltage and/or current to the alternator field coil may be fixed and may be stored in the memory of the controller. Specifically, the voltage and/or current to the alternator field coil may be reduced to 0V such that no voltage may be applied to the alternator field coil. In another example, the amount of decrease in the voltage and/or current to the alternator field coil may be determined by the controller based on how much slower the engine speed is than the second threshold. Thus, for greater differences in engine speed and the second threshold, the controller may apply greater voltage reductions to the alternator field coil. In response to the decreased output by the alternator, the controller may reduce the current to one or more of the battery and ancillary electrical devices. Reducing current to the ancillary electrical devices may include reducing to only one or more than one electrical devices. Thus, in some examples, current may not be reduced to all electrical devices. Further, current may only be reduced to those devices, whose brief cessation in use may not be noticed by a user. However, in other embodiments, the current supplied by the alternator to all ancillary electrical devices may be suspended during the reduction in voltage and/or current to the alternator field coil. In one embodiment, the controller may determine whether to reduce current to either the battery or the ancillary electrical devices, or both based on the amount of decrease in the voltage and/or current to the alternator field coil. Thus, greater reductions in the voltage and/or current to the alternator field coil may result in the controller decreasing current supplied to both the ancillary electrical devices and the battery. In another embodiment, the controller may reduce current supplied from the alternator to the battery before reducing current supplied to the electrical devices. In a further embodiment, the controller may reduce the current supplied to one or more electrical devices before reducing current supplied to the battery by the alternator. After shedding an electrical load, and/or reducing current supplied to the battery at 554, the controller may subsequently increase the throttle angle at 556. In other examples, the controller may execute 554 and 556 simultaneously. In still further examples, the controller may increase the throttle angle at 556 before shedding an electrical load and/or reducing current supplied to the battery at 554. It is also important to note that the duration of the decrease in voltage and/or current to the alternator field coil and current supplied to the battery at 552 may be less than the duration of the increase in throttle angle at 556.

Thus, method 500 may entail maintaining engine speed at idle at a desired engine speed or to within a desired range of engine speeds. Depending on the charge state of the battery, the controller may either enable or disable battery charging during idle. If the battery state of charge is greater than a threshold and battery charging is disabled during idle, then in a first mode, the ignition timing may be retarded from a first nominal value to an offset second value if electrical loads cannot be shed without being perceived by a user. However, in a second mode, if electrical loads are available to be shed without being perceived by a user during idle, then method 500 may include not retarding the ignition timing. If the engine speed is greater than the desired range of engine speeds during idle, then in the first mode, the offset retarded ignition timing may be retarded even further, and in the second mode, the ignition timing may be retarded from the nominal value to a retarded value. If the engine speed is less than the desired range of engine speeds during idle, then in the first mode, the ignition timing may be advanced from the offset second value, and in the second mode, one or more electrical loads may be shed so that the voltage and/or current to the alternator field coil may be reduced. If the charge state of the battery is less than a threshold and engine speed is greater than the desired range of engine speeds, then in a third mode, the battery may be charged and the ignition timing may be retarded from a nominal value. However, in a fourth mode, if the charge state of the battery less than a threshold, and then engine speed is less than the desired range of engine speeds, the voltage and/or current to the alternator field coil may be reduced. As such, one or more of battery charging and powering of electrical loads may be reduced and/or suspended. Said another way, the current output from the alternator may be reduced in the fourth mode, and as such, the power supplied to either the battery or various electrical devices, or both the battery and the electrical devices may be reduced. As such, in the fourth mode, when engine speed is less than the desired range of engine speeds at idle, the battery may not be charged for a duration.

Thus, in the first, second, and fourth modes, the battery may not be charged for the entire or only a portion of the duration of engine idle. Further, battery charging at idle may only persist for the duration of engine idle, if the battery charge is below a threshold, and electrical loads are not available to be shed. Additionally, ignition timing may only be retarded to an offset value at engine idle, if battery charging is disabled (e.g., battery is fully charged) and an electrical load is not available for shedding.

In this way, a method may comprise: when decelerating a vehicle driven by an engine, recharging a battery by an alternator driven by said engine; and during engine idle speed control, when engine speed is less than desired, in a first mode reducing electrical power to selected devices, and in a second mode offsetting a set point of desired engine ignition timing to a new set point when engine speed is higher than desired. The idle speed control may commence when said vehicle slows to a preselected speed. The method may further comprise increasing alternator torque during said vehicle deceleration to provide an additional braking force to said vehicle, wherein increasing alternator torque comprises increasing electrical power applied to a rotor field coil of said alternator. The method may further comprise decreasing alternator torque when reducing electrical power to selected devices in the first mode, and wherein the decreasing of alternator torque comprises decreasing electrical power applied to a rotor field coil of said alternator. Additionally, the method may comprise when engine speed is greater than desired, in the first mode retarding the ignition timing from the desired engine ignition timing, and in the second mode, retarding ignition timing further from the new set point. Said selected devices may comprise those electrical devices which if disabled or supplied with reduced electrical power would not be perceptible by an operator, said devices include one or more of the following: coolant fans, pumps, and heaters. The method may further comprise moving a throttle coupled to said engine for controlling airflow inducted into said engine toward a fully open position when said engine speed is less than desired. The method may further comprise moving a throttle coupled to said engine for controlling airflow inducted into said engine toward a fully closed position when said engine speed is higher than desired.

In this way a method may comprise controlling idle speed of an engine coupled to an alternator which supplies electrical power to various electrical devices in a vehicle driven by said engine. The method may include a first mode of said engine idle speed control which is active when reducing or shutting off electrical power applied to selected ones of said electrical devices would be perceived by an operator of the vehicle; during said first engine idle speed control mode, offsetting a steady state ignition timing value of said engine in a retarded direction to an offset retarded value, and when said engine speed is less than desired advancing said ignition timing from said offset retarded value, and when said engine speed is greater than desired, retarding said ignition timing from said offset retarded value. The method may additionally include a second mode of said engine idle speed control which is active when reducing or shutting off electrical power applied to said selected electrical devices would not be perceived by an operator of the vehicle; and during said second idle speed control mode, removing said offset retarded value, and disabling or reducing electrical power to said selected devices when said engine speed is less than desired, and retarding said ignition timing from said steady state ignition timing value when engine speed is higher than desired. The method may further comprise regulating field current in said alternator to control torque of said alternator and current output by said alternator. The field current regulation may include regulating said field current to decrease alternator torque and increase engine torque after said shutting off electrical power applied to said selected electrical devices in the second engine idle speed control mode. The selected electrical devices may comprise those electrical devices which if disabled or supplied with reduced electrical power would not be perceptible by an operator, said devices include one or more of the following: coolant fans, pumps, and heaters. The method may further comprise moving a throttle coupled to said engine for controlling airflow inducted into said engine toward a fully open position when said engine speed is less than desired and moving said throttle toward a closed position when said engine speed is higher than desired. The method may further comprise charging a battery of said vehicle via current provided by an alternator of said vehicle when the charge state of the battery drops below a threshold, but reducing the current supplied said battery in the first engine idle speed control mode when the engine speed is less than desired. Reducing the current supplied to the battery may comprise reducing alternator torque by reducing electrical power applied to a rotor field coil of the alternator.

In this way a method may comprise when decelerating a vehicle driven by an engine, recharging a battery by an alternator driven by said engine; commencing idle speed control of said engine when said vehicle has slowed to a preselected speed; enabling said battery charging at idle when the charge of the battery drops below a threshold; during a first mode of operation, offsetting nominal ignition timing of said engine in a retarded direction to an offset nominal value, and when said engine speed is less than desired advancing said ignition timing from said offset nominal value, and when said engine speed is greater than desired, retarding said ignition timing from said offset nominal value. The method may further comprise during said second mode of operation, when reducing the power applied to selected electrical devices would not be perceptible to an operator of said vehicle, shutting off said electrical power applied to said selected electrical devices when engine speed is less than desired and retarding ignition timing of said engine from said nominal ignition timing when said engine speed is greater than desired. The nominal ignition timing may correspond to a steady state ignition timing and said offset ignition timing is set to allow said ignition timing advance without inducing ignition knock in said engine. The method may further comprise voltage regulation of voltage provided by said alternator, said voltage regulation causing a reduction in torque of said alternator and related increase in torque provided by said engine in response to said shutting off electrical power applied to said selected electrical devices. The method may further comprise regulating field current in said alternator to control torque of said alternator. The method may additionally include increasing alternator torque during said vehicle deceleration to provide an additional braking force to said vehicle, wherein increasing alternator torque comprises increasing electrical power applied to a rotor winding of said alternator.

In this way, a method for an engine may comprise charging a battery when decelerating a vehicle, and maintaining engine speed to within a desired range of engine speeds during engine idle. When a vehicle is decelerating, a voltage and/or current to an alternator field coil of an alternator may be increased, so that the alternator torque, and therefore the load exerted on the engine by the alternator may be increased. Thus, a technical effect of providing a braking force to a vehicle may be achieved by increasing the voltage and/or current to an alternator during vehicle deceleration. Additionally, the current output by the alternator may increase in response to the increase in voltage and/or current to the alternator field coil. This additional current may be supplied to the battery to charge the battery during vehicle deceleration. As such, another technical effect of charging a battery during vehicle deceleration is achieved by increasing the voltage and/or current to an alternator field coil. At engine idle, the engine speed may be maintained within a desired range of engine speeds. Specifically, the ignition timing of the engine may be retarded if the engine speed increases by more than a threshold, to make the engine less efficient and decrease engine speed. Conversely, if engine speed drops by more than a threshold amount due to an increase in engine load, various electrical loads may be shed to decrease the load applied to the engine by the alternator. Said another way, if a brief interruption in the operation of one or more electrical devices were not perceivable by a user, then power to those devices may be momentarily discontinued, and the alternator current may be reduced by a reduction in the voltage and/or current to the alternator field coil. If interruption of the operation of at least one electrical devices would be noticed by a user, and battery charging is disabled at idle, then the ignition timing may be retarded to an offset value. The ignition timing may be retarded to the offset value so that if additional engine torque is needed due to a decrease in engine speed at idle, the ignition timing may be advanced without being advanced past a point that may induce engine knock. However, retarding the ignition timing may cause the engine to run less efficiently and may consume more fuel than when the ignition timing is not retarded. Thus, another technical effect of increasing fuel efficiency at engine idle is achieved, by not retarding ignition timing at engine idle, and decreasing a voltage and/or current to the alternator field coil if the engine speed drops below a desired range of engine speeds. Thus, by using the alternator, instead of ignition timing as a means to add engine torque when the engine speed drops below a desired range of engine speeds during idle, fuel consumption of the engine during idle may be reduced. Said another way, during engine idle, ignition timing may not be retarded, and to compensate for drops in engine speed during engine idle, alternator torque may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
when decelerating a vehicle driven by an engine, recharging a battery by an alternator driven by said engine and increasing alternator torque during said vehicle deceleration to provide an additional braking force to said vehicle; and
during engine idle speed control, when engine speed is less than desired, in a first mode reducing electrical power supplied to selected devices from the alternator, and in a second mode offsetting a set point of desired engine ignition timing to a new set point when engine speed is higher than desired.

2. The method recited in claim 1 wherein said idle speed control commences when said vehicle slows to a preselected speed.

3. The method recited in claim 1 wherein increasing alternator torque comprises increasing voltage or current applied to a rotor field coil of said alternator and increasing current flow to the battery when alternator torque is increased.

4. The method recited in claim 1 further comprising decreasing alternator torque when reducing electrical power to selected devices in the first mode, and wherein the decreasing of alternator torque comprises decreasing voltage or current applied to a rotor field coil of said alternator.

5. The method recited in claim 1 further comprising when engine speed is greater than desired, in the first mode, retarding the ignition timing from the desired engine ignition timing, and, in the second mode, retarding ignition timing further from the new set point.

6. The method recited in claim 1 wherein said selected devices comprise electrical devices which if disabled or supplied with reduced electrical power would not be perceptible by an operator, said devices including one or more of the following: coolant fans, pumps, heaters, air conditioners, fans, radio, lights, heated rear window, heated steering wheel, heated shift knob, and heated front window.

7. The method recited in claim 1 further comprising moving a throttle coupled to said engine for controlling airflow inducted into said engine toward a fully open position when said engine speed is less than desired or toward a fully closed position when said engine speed is higher than desired.

8. A method, comprising:
controlling idle speed of an engine coupled to an alternator which supplies electrical power to various electrical devices in a vehicle driven by said engine;
a first mode of said engine idle speed control which is active when reducing or shutting off electrical power applied to selected ones of said electrical devices would be perceived by an operator of the vehicle;
during said first engine idle speed control mode, offsetting a steady state ignition timing value of said engine in a retarded direction to an offset retarded value, and when engine speed is less than desired, advancing ignition timing from said offset retarded value, and when engine speed is greater than desired, retarding said ignition timing from said offset retarded value;
a second mode of said engine idle speed control which is active when reducing or shutting off electrical power applied to said selected ones of said electrical devices would not be perceived by an operator of the vehicle; and
during said second idle speed control mode, removing said offset retarded value, and disabling or reducing electrical power to said selected ones of said electrical devices when said engine speed is less than desired, and retarding said ignition timing from said steady state ignition timing value when engine speed is higher than desired.

9. The method recited in claim 8 further comprising regulating field current in said alternator to control torque of said alternator and current output by said alternator.

10. The method recited in claim 9 wherein said field current regulation includes regulating said field current to decrease alternator torque and increase engine torque after said shutting off electrical power applied to said selected ones of said electrical devices in the second engine idle speed control mode.

11. The method recited in claim 8 further comprising moving a throttle coupled to said engine for controlling airflow inducted into said engine toward a fully open position when said engine speed is less than desired and moving said throttle toward a closed position when said engine speed is higher than desired.

12. The method recited in claim 8 further comprising charging a battery of said vehicle via current provided by said alternator of said vehicle when a charge state of the battery drops below a threshold, but reducing the current supplied to said battery in the first engine idle speed control mode when the engine speed is less than desired.

13. The method recited in claim 12 wherein the reducing the current supplied to the battery comprises reducing alternator torque by reducing voltage or current applied to a rotor field coil of the alternator.

14. A method, comprising:
when decelerating a vehicle driven by an engine, recharging a battery by an alternator driven by said engine;
commencing idle speed control of said engine when said vehicle has slowed to a preselected speed;
enabling said battery charging at idle when a charge of the battery drops below a threshold;
during a first mode of operation, offsetting nominal ignition timing of said engine in a retarded direction to an offset nominal value, and when engine speed is less than desired, advancing ignition timing from said offset nominal value, and when said engine speed is greater than desired, retarding said ignition timing from said offset nominal value; and during a second mode of operation, when reducing electrical power applied to selected electrical devices would not be perceptible to an operator of said vehicle, shutting off said electrical power applied to said selected electrical devices when engine speed is less than desired and retarding ignition timing of said engine from said nominal ignition timing when said engine speed is greater than desired.

15. The method recited in claim 14 wherein said nominal ignition timing corresponds to a steady state ignition timing and an offset ignition timing is set to allow said ignition timing advance without inducing ignition knock in said engine.

16. The method recited in claim 14 further comprising voltage regulation of voltage provided by said alternator, said voltage regulation causing a reduction in torque of said alternator and related increase in torque provided by said engine in response to said shutting off electrical power applied to said selected electrical devices.

17. The method recited in claim 14 further comprising increasing alternator torque during said vehicle deceleration to provide an additional braking force to said vehicle, wherein increasing alternator torque comprises increasing voltage or current applied to a rotor winding of said alternator.

18. The method of claim 14 further comprising supplying electrical power to the selected electrical devices from the battery and decreasing alternator torque.

19. The method of claim 8 wherein a position of a brake pedal is used as a factor to determine desired engine speed.

20. The method of claim 1 wherein an amount of charge stored on the battery is used to determine whether to increase alternator torque.

* * * * *